(12) United States Patent
Hajost et al.

(10) Patent No.: US 10,880,171 B2
(45) Date of Patent: Dec. 29, 2020

(54) GROUP POLICY OBJECT UPDATE COMPLIANCE AND SYNCHRONIZATION

(71) Applicant: SteelCloud, LLC, Ashburn, VA (US)

(72) Inventors: Brian H. Hajost, Great Falls, VA (US); Fredi Jaramillo, Ashburn, VA (US); Matthew Heimlich, Leesburg, VA (US)

(73) Assignee: STEELCLOUD, LLC, Ashburn, VA (US)

( * ) Notice: Subject to any disclaimer, the term of this patent is extended or adjusted under 35 U.S.C. 154(b) by 187 days.

(21) Appl. No.: 16/125,760

(22) Filed: Sep. 9, 2018

(65) Prior Publication Data

US 2020/0084105 A1 Mar. 12, 2020

(51) Int. Cl.
*H04L 12/24* (2006.01)
(52) U.S. Cl.
CPC ...... *H04L 41/0866* (2013.01); *H04L 41/0813* (2013.01)
(58) Field of Classification Search
CPC . H04L 41/00–41/5096; H04L 41/08–41/0866; G06F 8/60–8/65; G06F 8/70; G06F 11/3051–11/3055
See application file for complete search history.

(56) References Cited

U.S. PATENT DOCUMENTS

| | | | | |
|---|---|---|---|---|
| 7,428,583 B1* | 9/2008 | Lortz | ................. | H04L 41/0893 709/221 |
| 8,078,713 B1* | 12/2011 | Kim | ..................... | G06F 21/604 709/223 |
| 8,935,365 B1* | 1/2015 | Levin | ................... | G06F 21/604 709/220 |
| 2008/0104661 A1* | 5/2008 | Levin | ................. | G06F 21/6218 726/1 |

* cited by examiner

*Primary Examiner* — Clayton R Williams
(74) *Attorney, Agent, or Firm* — Steven M. Greenberg, Esq.; Shutts & Bowen LLP

(57) ABSTRACT

Embodiments of the present invention provide for group policy object (GPO) update compliance. A method for GPO update compliance includes selecting both a compliance update and also a computing system as an endpoint targeted for receiving the compliance update, directing execution of a remediation process that applies the compliance update onto the selected endpoint and performing a re-scan of the selected endpoint subsequent to the execution of the remediation process. The method further includes executing a GPO update within a threshold period of time after the re-scan and repeating the re-scan after the GPO update and then comparing a log produced by the repeated re-scan after the GPO update with a log produced by the re-scan before the GPO update, detecting an out-of-compliance update in the comparison and responding to the out-of-compliance update by directing a repair of the out-of-compliance update using a domain login for the selected endpoint.

12 Claims, 2 Drawing Sheets

GROUP POLICY OBJECT UPDATE COMPLIANCE AND SYNCHRONIZATION

BACKGROUND OF THE INVENTION

Field of the Invention

The present invention relates to computer network compliance and more particularly to local policy and group policy object update compliance and synchronization.

Description of the Related Art

A computing domain is a form of a computer network in which all user, computers and devices are registered with a central database located on one or more clusters of central computers known as domain controllers. Authentication then takes place on the one or more domain controllers in a centralized fashion. As such, each person accessing computing resources within the domain which resources require authentication receives a unique user account that can then be assigned access to the resources within the domain without requiring each person to authenticate separately into each of the resources of the computing domain. In the Microsoft™ Windows™ environment, the "Active Directory" is the Windows component that controls the Windows domain.

The concept of a centralized computing domain stands in contrast with that of a workgroup in which each computer maintains its own database of security principals or local policies. As a subset of the Active Directory™, a group policy is a feature that controls the working environment of user accounts and computer accounts through group policy objects ("GPO's"). The group policy provides centralized management and configuration of operating systems, applications, and the settings of a user in an Active Directory™ environment. As it is well-known, the Active Directory™ is an extremely complex system where each GPO is built by layering policies from multiple sources applied to systems organized into complex groupings. Few administrators understand precisely what policies are built into the GPO of a managed deployment and precisely what systems are affected by those GPOs.

To compound matters, the Active Directory™ takes preference over local policies that have been traditionally set up manually or with automated scripts. At the same time, the Active Directory™ automatically pushes policies through GPOs to the various systems on a scheduled basis. Oftentimes, those responsible for maintaining systems compliance find that efforts in local policy compliance are undermined by the automated action of the Active Directory™ overwriting manually specified configurations without any artifact or log entry indicating the precise remedial actions undertaken by the Active Directory™. Thus, the Active Directory™ is often never adequately synchronized with system-level compliance efforts leading to never-ending compliance inconsistencies that may be described as "drift". With the Active Directory™ automatically overwriting local policies without notification, it is difficult to bring local policies and GPOs in synchronization.

BRIEF SUMMARY OF THE INVENTION

Embodiments of the present invention address deficiencies of the art in respect to computer network compliance and provide a novel and non-obvious method, system and computer program product for group policy object ("GPO") update compliance. In an embodiment of the invention, a method for GPO update compliance includes selecting a computing system as an endpoint targeted for compliance remediation, directing execution of a remediation process for a compliance update on the selected endpoint and performing a re-scan of the selected endpoint subsequent to the execution of the remediation process. The method further includes executing a GPO update within a threshold period of time after the re-scan and repeating the re-scan after the GPO update. The method even further includes comparing the repeated re-scan after the GPO update with the re-scan before the GPO update, detecting an out-of-compliance update in the comparison and directing a repair of the out-of-compliance update using a domain login for the selected endpoint.

In one aspect of the embodiment, the method further includes, prior to performing the re-scan of the selected endpoint and subsequent to the execution of the remediation process, determining a threshold period of time between GPO updates, performing the rescan after an initial GPO update and completing the rescan before the GPO update within the threshold period of time between GPO updates. In another aspect of the embodiment, the comparison of the repeated re-scan after the GPO update with the re-scan before the GPO update includes a matrix that includes controls changed by the GPO update but not in compliance. In yet another aspect of the embodiment, the matrix further includes controls changed by the GPO update and in compliance.

In another embodiment of the invention, a data processing system configured for group policy object (GPO) update compliance has been claimed. The system includes a host computing platform including one or more computers, each with memory and at least one processor. The system further includes a network of the host computing platform which includes an Active Directory of GPO updates executing in the memory of the host computing platform and one or more different computing systems of the network of the host computing platform. The system even further includes a GPO update compliance module in communication with the host computing platform. The module includes program code enabled upon execution in the host computing platform to select a computing system as an endpoint targeted for compliance remediation, to direct execution of a remediation process for a compliance update on the selected endpoint and to perform a re-scan of the selected endpoint subsequent to the execution of the remediation process. The program code is further enabled to execute a GPO update within a threshold period of time after the re-scan and repeat the re-scan after the GPO update. The program code is even further enabled to compare the repeated re-scan after the GPO update with the re-scan before the GPO update, to detect an out-of-compliance update in the comparison and to direct a repair of the out-of-compliance update using a domain login for the selected endpoint.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for group policy object update compliance and synchronization with local policy objects. An endpoint, such as a computer or local network of computers, of a computer domain controlled by a domain controller is selected for compliance remediation. The remediation process begins with the performing of a rescan of policies, functions and systems affected by the domain controller stored at the endpoint and storing the results of the rescan. Subsequent to the rescan, a GPO update is pushed by the domain controller to the endpoint. The same rescan is then performed a second time after the GPO update and the results of the second rescan are stored. The two rescan results are compared to determine what was changed by the GPO update and whether the GPO's are out of compliance with the desired policies. Thus, the GPOs or the local policies can automatically be changed so that they are brought in compliance and synchronized with the desired policies. Because of the complexity of the GPOs within a domain controller, the syncing issue with local policies may be performed more than once, as new local policies are created, or continuously.

Figure 1:
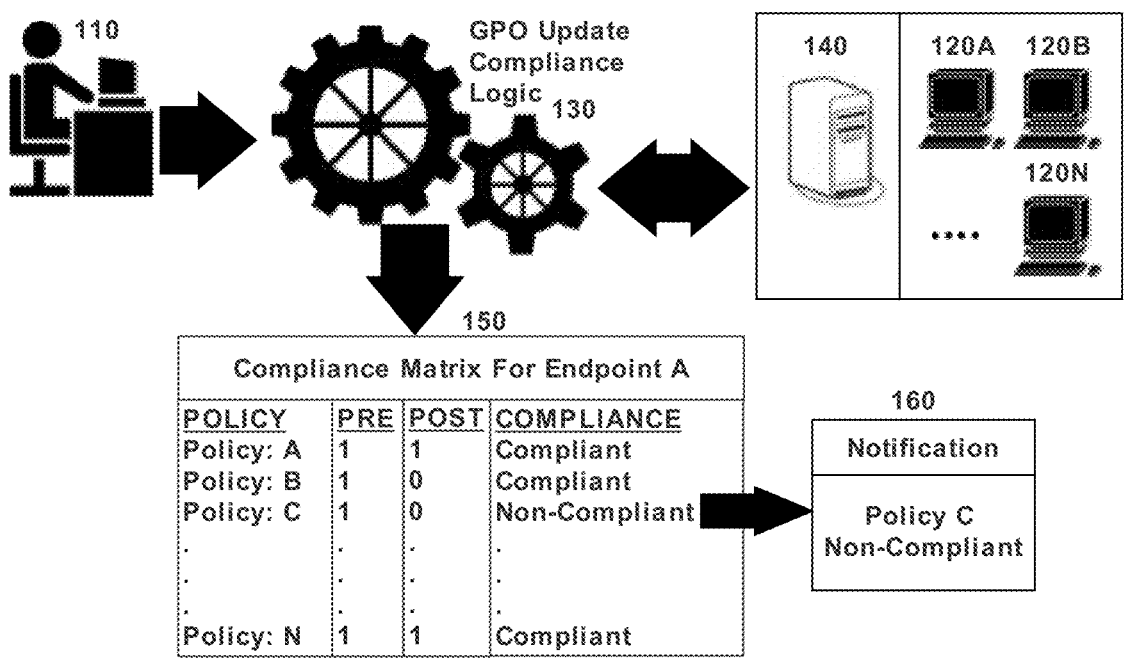
FIG. 1 is a pictorial illustration of a process for GPO update compliance.

In further illustration, FIG. 1 is a pictorial illustration of a process for GPO update compliance in the context of the Microsoft™ Windows™ computing environment. As shown in FIG. 1, a Windows™ domain network server 140 that is subject to GPO updates of an Active Directory™ is connected to multiple different endpoints 120A, 120B, 120N. The endpoints 120A, 120B, 120N are local computing devices, or groups of computing devices that may have their own servers and networks, that store local polices, systems, user profiles, preferences, etc. that the Active Directory™ of the Windows™ domain 140 may overwrite with GPO updates. An end user can communicate with the Windows™ domain 140 through one of the endpoints 120A, 120B, 120N.

In order to remediate local endpoint policy preferences with the Active Directory™ of the Windows™ Domain 140, an end user 110 may initiate, or an automated procedure may initiate, a compliance remediation procedure through GPO update compliance logic 130. An endpoint 120A, 120B, 120N is selected and GPO update compliance logic 130 performs a rescan of the endpoint 120A, 120B, 120N. The rescan is performed within a threshold period of time after a GPO update and before the next GPO update occurs. A GPO update is pushed by the Active Directory of the Windows Domain 140 to the endpoint 120A, 120B, 120N. GPO update compliance logic 130 then performs a second rescan of the endpoint 120A, 120B, 120N within a similar threshold period of time. The policies, or any data subject to GPO updates of the Active Directory™ of the Windows™ domain 140, along with the corresponding results of the rescans, pre-GPO update and Post-GPO update, are stored in a matrix 150.

The results of the rescans are compared in the compliance matrix 150 to determine whether any changes were made by the GPO update and if those changes are in compliance with the desired policy preferences. The desired policy preferences may be the local policies. If those changes are out of compliance with the desired preferences, a notification 160 is displayed in a display to end user 110 regarding the GPO update that caused the non-compliant changes. The end user can then login to the Windows™ domain 140 through one of the endpoints 120A, 120B, 120N and change the GPO of the Active Directory™ to bring the GPO in compliance with the desired preferences. This process may be automated to automatically and continuously bring the GPO non-compliant updates in compliance and synchronized with the local policy preferences stored on the endpoint 120A, 120B, 120N.

Figure 2:
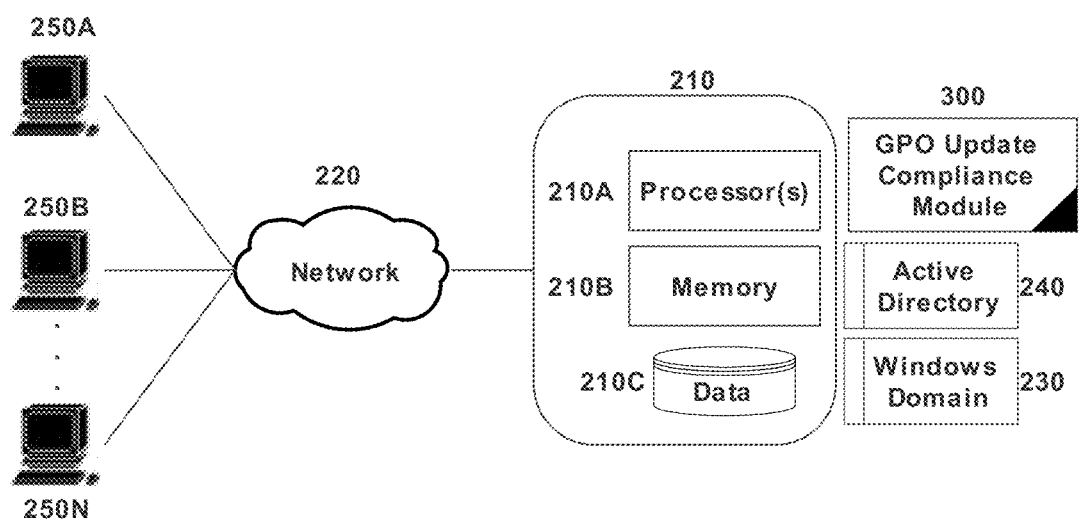
FIG. 2 is a schematic illustration of a data processing system configured for GPO update compliance; and, FIG. 3 is a flow chart illustrating a process for GPO update compliance.

The process described in connection with FIG. 1 is implemented in a data processing system. In yet further illustration, FIG. 2 schematically shows a data processing system configured for GPO update compliance. The system includes a host computing platform 210 that includes one or more computers, each with one or more processors 210A, memory 210B, a display and fixed storage 210C. The host computing system includes a computing domain 230, the policies, systems, functions, user profiles, etc. are controlled by the domain controller 240. The host computing system 210 is connected over the network 220, the network 220 controlled by the computing domain 230, to different endpoints 250A, 250B, 250N of the network 220.

The endpoints 250A, 250B, 250N may be computers, groups of computers, servers, or network that are subsets of the network 220. The endpoints 250A, 250B, 250N have local policies, systems, functions that are affected by the GPOs of the domain controller 240 of the computing domain 230. The end user can access the network 220, host computing system 210, domain controller 240, and computing domain 230 through displays of the host computing system 210 or displays included in the endpoints 250A, 250B, 250N.

Importantly, the GPO update compliance module 300 executes in memory of the host computing platform 210. The GPO update compliance module 300 performs a rescan of a selected endpoint 250A, 250B, 250N and stores the rescan in a data store 210C. The domain controller 240 of computing domain 230 pushes a GPO update over the network 220 to the selected endpoint 250A, 250B, 250N. Following the GPO update, a second rescan is performed of the selected endpoint 250A, 250B, 250N and the second scan is stored in a data store 210C.

GPO update compliance module 300 compares the rescans to determine whether the any changes were made by the GPO update of domain controller 240. If there are any changes, GPO update compliance module 300 determines whether the changes are out of compliance with the desired policies, systems, functions, user profiles, etc. The desired preferences may be the locally stored policies, systems, functions, user profiles, etc. If the GPO update compliance module 300 determines there are changes made by the GPO update that are out of compliance with the desired preferences, GPO update compliance module 300 directs a repair of the out-of-compliance update using a domain login of computing domain 230 to access the GPO's of the domain controller 240 for the selected endpoint 250A, 250B, 250N. Alternatively, if the GPO update compliance module 300 determines there are changes made by the GPO update that are out of compliance with the desired preferences, GPO update compliance module 300 notifies the end user that the GPO update is out of compliance.

Figure 3:
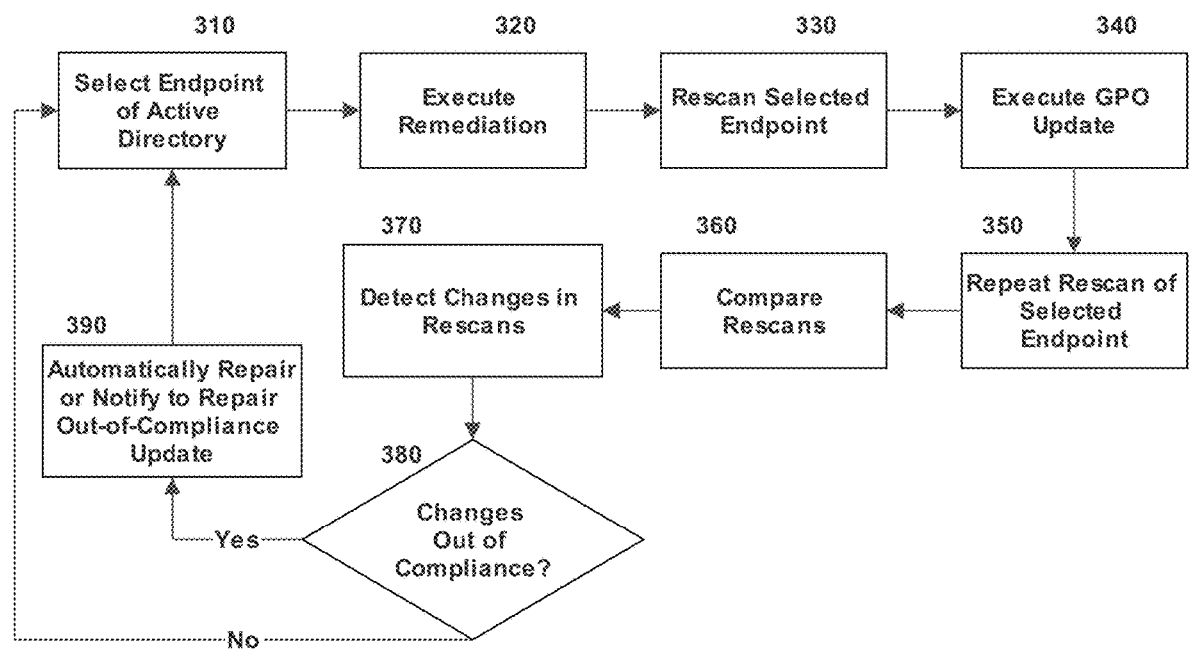

In more particular illustration of the operation of the program code of the GPO update compliance module 300, FIG. 3 is a flow chart illustrating a process for GPO update compliance. Beginning in block 310, an endpoint subject to the GPO of the domain controller is selected for policy compliance remediation. In block 320, the compliance remediation is executed and, in block 330, the selected endpoint is rescanned and the rescan is stored. In block 340, the GPO update executes on the endpoint. After the GPO update executes, in block 350, the rescan of the selected endpoint is repeated and stored.

The rescans are compared in block 360 in order to detect any changes between the data or policies within the rescans in block 370. In block 380, it is determined if there are any changes and if those changes are in compliance. If any of the changes are not in compliance, in block 390, the policies are automatically repaired or the end user is notified to repair the out-of-compliance update. The process may be repeated for different endpoints and for subsequent policy updates automatically or at the command of the end user. Thus, GPO updates can be synchronized with local policies.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are pos- sible without departing from the scope of the invention defined in the appended claims as follows:

1. A group policy object (GPO) update compliance method comprising:
   selecting both a compliance update and also a computing system as an endpoint targeted for receiving the compliance update;
   directing execution of a remediation process that applies the compliance update onto the selected endpoint;
   performing a re-scan of the selected endpoint subsequent to the execution of the remediation process, executing a GPO update within a threshold period of time after the re-scan and repeating the re-scan after the GPO update;
   comparing a log produced by the repeated re-scan after the GPO update with a log produced by the re-scan before the GPO update and detecting an out-of-compliance update in the comparison; and,
   responding to the detection of the out-of-compliance update by directing a repair of the out-of-compliance update using a domain login for the selected endpoint.

2. The method of claim 1, further comprising:
   prior to performing the re-scan of the selected endpoint and subsequent to the execution of the remediation process, determining a threshold period of time between GPO updates; and,
   performing the rescan after an initial GPO update; and,
   completing the rescan before the GPO update within the threshold period of time between GPO updates.

3. The method of claim 1, wherein the comparison of the repeated re-scan after the GPO update with the re-scan before the GPO update comprises a matrix comprising controls changed by the GPO update but not in compliance.

4. The method of claim 3, wherein the matrix further comprises controls changed by the GPO update and in compliance.

5. A data processing system configured for group policy object (GPO) update compliance, the system comprising:
   a host computing platform comprising one or more computers, each with memory and at least one processor;
   a network of the host computing platform comprising a domain controller of GPO updates executing in the memory of the host computing platform; one or more different computing systems of the network of the host computing platform; and,
   a GPO update compliance module in communication with the host computing platform, the module comprising program code enabled upon execution in the host computing platform to select both a compliance update and also one of the computing systems as an endpoint targeted for receiving the compliance update, to direct execution of a remediation process that applies the compliance update onto the selected endpoint, to perform a re-scan of the selected endpoint subsequent to the execution of the remediation process, to execute a GPO update within a threshold period of time after the re-scan, to repeat the re-scan after the GPO update, to compare a log produced by the repeated re-scan after the GPO update with a log produced by the re-scan before the GPO update, to detect an out-of-compliance update in the comparison and to respond to the detection of the out-of-compliance update by directing a repair of the out-of-compliance update using a domain login for the selected endpoint.

6. The system of claim 5, wherein the program code is further enabled, prior to performing the re-scan of the selected endpoint and subsequent to the execution of the remediation process, to determine a threshold period of time between GPO updates and to perform the rescan after an initial GPO update and complete the rescan before the GPO update within the threshold period of time between GPO updates.

7. The system of claim 5, wherein the comparison of the repeated re-scan after the GPO update with the re-scan before the GPO update comprises a matrix comprising controls changed by the GPO update but not in compliance.

8. The system of claim 7, wherein the matrix comprises controls changed by the GPO update and in compliance.

9. A computer program product for group policy object (GPO) update compliance, the computer program product comprising a non-transitory computer readable storage medium having program instructions embodied therewith, the program instructions executable by a device to cause the device to perform a method comprising:
   selecting both a compliance update and also a computing system as an endpoint targeted for receiving the compliance update;
   directing execution of a remediation process that applies the compliance update onto the selected endpoint;
   performing a re-scan of the selected endpoint subsequent to the execution of the remediation process, executing a GPO update within a threshold period of time after the re-scan and repeating the re-scan after the GPO update;
   comparing a log produced by the repeated re-scan after the GPO update with a log produced by the re-scan before the GPO update and detecting an out-of-compliance update in the comparison; and,
   responding to the detection of the out-of-compliance update by directing a repair of the out-of-compliance update using a domain login for the selected endpoint.

10. The computer program product of claim 9, wherein the method further comprises: prior to performing the re-scan of the selected endpoint and subsequent to the execution of the remediation process, determining a threshold period of time between GPO updates; performing the rescan after an initial GPO update; and, completing the rescan before the GPO update within the threshold period of time between GPO updates.

11. The computer program product of claim 9, wherein the comparison of the repeated re-scan after the GPO update with the re-scan before the GPO update comprises a matrix comprising controls changed by the GPO update but not in compliance.

12. The computer program product of claim 11, wherein the matrix comprises controls changed by the GPO update and in compliance.

* * * * *